Patented Feb. 12, 1935

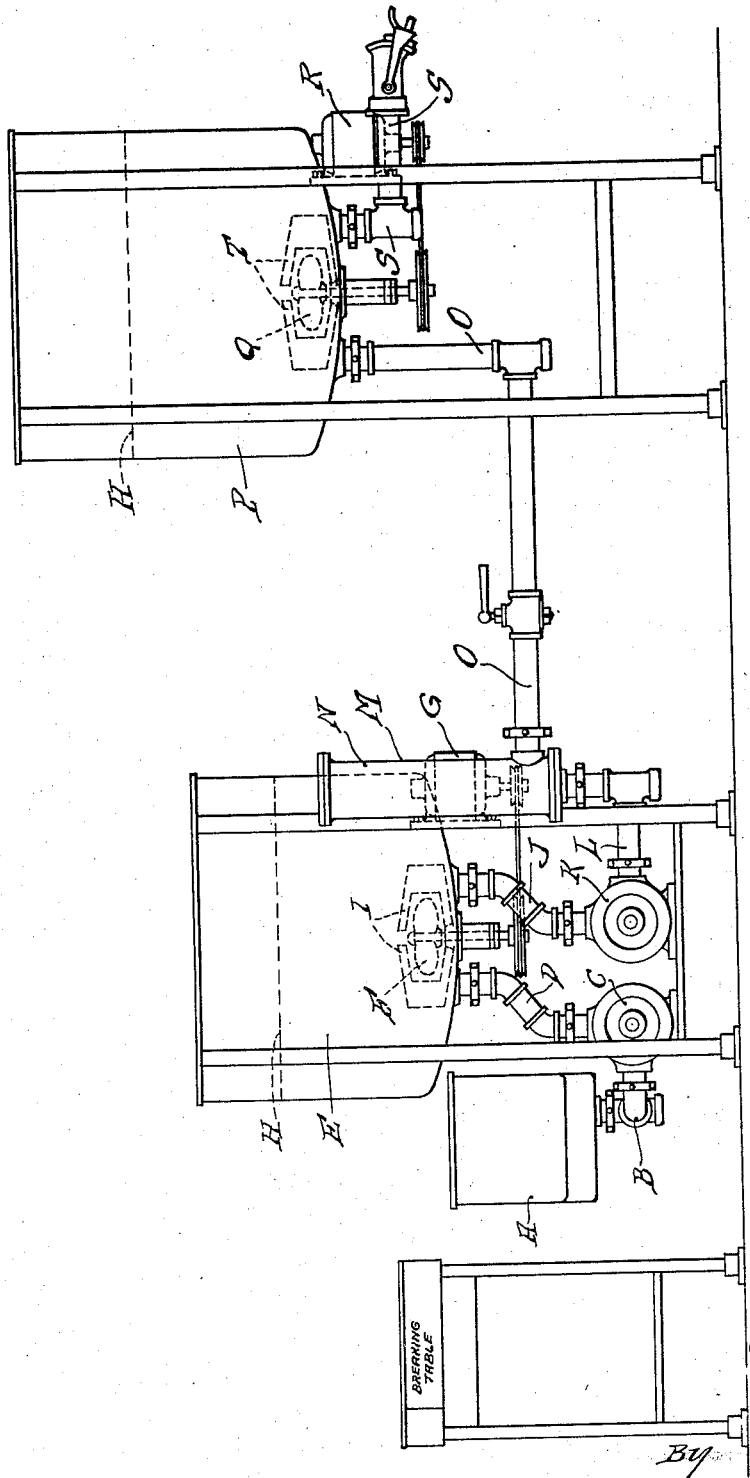

1,991,164

UNITED STATES PATENT OFFICE 1,991,164

PROCESS OF TREATING EGGS

William L. Lomax, Chicago, Ill.

Application August 15, 1931, Serial No. 557,226

6 Claims. (Cl. 99—11)

The present invention relates to a process for the preservation and canning of eggs and has to do particularly with a means for obtaining a better and improved product. The invention relates primarily to what are known as "canned eggs", and is of large importance in the baking and other industries in that superior canned eggs and greater uniformity of quality is obtained. It is useful for canned whole eggs, canned yolks, or canned whites of eggs.

At the present time, there are a number of egg breaking establishments or concerns. Eggs are broken, treated, and placed in cans. The yolks and the whites may be separated before canning when desired. The cans are maintained in cold storage until marketed and used. Great volumes of canned eggs are employed by bakers, or in other trades in which there is a demand for fresh eggs, or their equivalent, or for the materials which are contained in eggs. It is for the purpose of improving the canned product prepared by the egg breaker and going to the baker and others using such a product that the present process was perfected.

At the present time, and until the discovery of the present process, canned eggs contained some impurities or lacked uniformity. Such eggs contained materials which were not wholly desirable to the users thereof and which sometimes caused rejection of the product, or the use thereof under apprehension.

Conventionally, canned eggs have been subject to the following impurities or objectionable features, as well as to other undesirabilities. Splinters of the egg shell have gotten into the cans with the eggs to remain there until the eggs were used. When such splinters or parts of shells have not been noted in the product when in the hands of the users and are not removed by such users, the result has been that the ultimate consumer of say, cake, bites into a piece or splinter of shell. A number of damage suits have resulted against users of canned eggs because of the failure of the egg breaker or user of the product to successfully remove all the splinters or pieces of egg shell from the product.

Another objectionable feature in canned eggs has been lumps, some of which are called "meat balls" and others blood spots. Just what causes lumps to form is hard to understand. Some appear to be hardened portions of yolk. Such lumps are found in varying quantities in the heretofore conventional type of canned eggs. Lumps are objectionable to a baker or to other users of canned eggs in that lumps persist and are not broken down during the course of the mixing incidental to the use of the eggs. Lumps are successfully removed only at the breaking plant and must be watched for very carefully. Notwithstanding care, many get into the canned product.

Some dirt may get into conventionally canned eggs. Notwithstanding the fact that the eggs to be broken are kept as clean as is possible to do during the egg breaking operation and only clean eggs are supposed to be used, many of the eggs which get to the egg breaker have foreign matter upon the shell. Not infrequently such foreign matter gets into the eggs before being canned and is carried therewith into a cake or other product in which the canned eggs are employed.

Another product which is normally a part of conventionally canned eggs is the chalaza which serves no good purpose in the egg material insofar as baking is concerned. No successful means for excluding the chalaza from canned eggs has heretofore been devised as far as applicant knows, and until the present invention the chalaza was present in canned eggs. Its slow solubility makes it an undesirable addition to the eggs.

Because of the repeated handlings and mixings of eggs during canning, air has gotten thereinto. There has been a resulting formation of a foam and a froth upon the eggs which foam and froth is highly objectionable.

If air gets into the eggs during the course of canning, a certain amount of foam or froth forms upon the top of the eggs in the can. This frothy or foamy material, during the course of the preservation of the eggs at low temperatures, hardens and becomes gelatinous and provides an undesirable and unusable addition to the canned egg product. The baker or other user of canned eggs endeavors to find a product which is free from froth or foam, which freedom necessitates a total exclusion of air from the eggs after breaking and during the process of canning.

The objects of the present invention include the provision of a process for canning eggs which will exclude shell or splinters of shell from the eggs before canning, will prevent the formation of lumps or remove such lumps from the canned eggs in the course of canning, will exclude all dirt from the canned eggs, will remove the chalaza, which will keep air out of the eggs, and which will prevent the formation of foam and froth therein.

All of these objects are attained in the process hereinafter described, and a new and superior canned egg product is the result of such new process.

For carrying out of the present invention, an apparatus such as is illustrated in the accompanying sheet of drawing may be employed, such drawing comprising a single figure somewhat schematic in its effect. Like reference characters are used to designate similar parts in the drawing and in the description of the process following.

For the purpose of carrying out the present process, eggs are broken at a breaking table in the usual way. The egg breaking work is generally done by help skilled in breaking the shell to prevent unnecessary rupture thereof or of the contents of the shell. The women employed for this work become expert in detecting strictly fresh eggs from those which are too old to can. These usable eggs are segregated in a can or receptacle and the old eggs are rejected. Only fresh eggs are employed for canning. The various devices employed in egg breaking or in aiding the operative in the inspection of the broken egg do not form a part of the present process and need not be here illustrated or described.

The selected fresh eggs, which are temporarily dumped into a pail, bucket, or other suitable dish, are emptied into a receiving tank or hopper A, the left hand tank or member in the drawing. From said hopper or receiving tank A, the eggs are drawn through the conduit B by a pump C and are forced upwardly from the pump C through the discharge conduit D into an egg mixing tank E. The eggs which are not disintegrated in the mixing tank A are broken up to some extent in the pump C, and are forced into the tank E against the back pressure of the contents of said tank E. Hence, such eggs are not agitated in the presence of air which might otherwise be the case, agitation causing air to mix with the eggs. The effect of the pump C is to disintegrate the eggs without admission of air thereto or the forcing of air thereinto.

In the tank E there is a bottom propeller F which is adapted to be actuated by any suitable prime mover such as the motor G. As the agitation of the propeller F is at the bottom of a tank of eggs and below the top level, the tank E being filled to the line H before operation of the propeller F is started, there is no opportunity to draw or force air into the eggs in the tank.

By the use of the baffles I which surround the propeller F, any tendency on the part of the liquid egg material to rotate in the direction of the movement of the propeller F is overcome, and a complete mixing and agitating of the eggs, without the introduction of air thereinto, is thus obtained in the tank E. When such agitation has been continued until the whites and the yolks of the eggs are thoroughly broken up, disintegrated, and intermixed, the agitation is stopped in tank E, whereupon the egg material which is thoroughly uniform in its proportion of yolk and white content throughout is drawn out of the tank E through the pipe J by a pump K, and forced through the conduit L into a filter M.

The egg material or mix is forced through the filter M from the inside thereof outwardly. The porosity of the filter M is such that the chalaza, splinters or pieces of shell, and foreign matter will not pass through the pores of the filter but will remain on the interior of the filter M.

The filter M is encased in a housing N of suitable dimensions and coextensive with the length of the filter M. As egg material is forced through the pores of the filter M, it collects in the housing N to be drawn therefrom by way of a pipe O by the force of the pump J. The egg material is thus forced to travel into a tank P, which is supplied with an agitator Q adapted to be actuated by a motor R.

The filter M has an effective area which is a large multiple of the cross sectional area of conduit L, this being made clear by the drawing which shows the conduit L of a small diameter relative to the diameter of housing N with which the filter M is coextensive as previously pointed out.

The tank P is a temporary storage tank from which the thoroughly mixed egg material is withdrawn coincidentally with its being run into cans, the discharge from the tank P being through the pipe S.

In order to keep the material thoroughly agitated while it is being withdrawn, the agitator Q is operated, said agitator being enclosed by a baffle T to prevent a circulatory motion being imparted to the contents of the tank P.

The movement of the egg material through the filter into the tank P is always with a back pressure against the egg material so that there is no opportunity for air to be incorporated into the mixture during its course into the storage tank P. Likewise, no air is incorporated into the mix during the can filling operation.

In the present process, when the whole egg is employed, disintegration of the egg and an even distribution of the yolks and the whites. This distribution is very important when a recipe calls for a whole egg for a baker depends upon an average proportion of white and yolk in his whole egg material. Unless the average proportion of the white and yolk as it exists in a single egg is maintained in the large cans of whole eggs which are put in storage and thereafter withdrawn therefrom for the use of bakers, disastrous results will follow because the principles and operations of baking are founded upon the natural proportions of the white of an egg to the yolk thereof.

In the present process, the egg material is kept under agitation at all times but the agitation is not of a type to cause incorporation of air into the mix.

From time to time, the filter M is removed from its casing N and cleansed and replaced or a fresh filter substituted. It is indeed surprising to learn the great quantity of shell and splinters of shell and other undesirable material which collects in such a filter.

Likewise, the fact that the eggs are always advanced under back pressure and at no time have an opportunity to be agitated in the presence of air, there is absolutely no froth or foam upon the eggs in the cans when they are put in storage. Hence, there is no froth or foam thereon or therein to separate and form a layer at the top of the cans of eggs and to provide an annoyance to the user thereof.

When desired, the hopper or small tank A may be omitted, and the eggs deposited directly in the mixing tank, or the eggs may go through pump to filter and then to the second tank. Such an arrangement may be desirable in the smaller egg breaking establishments.

The three essentials in the apparatus for carrying out the present process are a hopper to receive the eggs, a filter, and a vat or receptacle to receive the filter material. Movement through the apparatus should always be against back pressure, as indicated. The process may be effectively carried out upon yolks alone or whites alone, it not being unusual to can these following separation by the egg breakers.

At the present time it is a common practice to pack eggs containing a quantity of salt, sugar, glycerine, syrup, and other ingredients. Apparently, the number of such added ingredients is increasing from time to time.

What I claim is new and desire to secure by Letters Patent of the United States is:

1. That process of preparing eggs for canning which comprises the step of forcing egg meats out of a conduit having a relatively small area in cross section and through a body possessing an effective filtering surface of an area comprising a large multiple of the cross sectional area of such conduit, the filtering body having a porosity whereby the egg meats are disintegrated and made homogeneous and freed from chalaza, splinters or pieces of shell, and foreign matter.

2. The process of preparing eggs for canning which comprises the step of forcibly elevating egg meats from a conduit having a relatively small area in cross section and through a body possessing an effective filtering surface of an area comprising a large multiple of the cross sectional area of such conduit, the filtering body having a porosity whereby the egg meats are disintegrated and made homogeneous and freed from chalaza, splinters or pieces of shell, and foreign matter.

3. That process of preparing eggs for canning which comprises the step of forcing egg meats out of a conduit having a relatively small area in cross section and through a cylindrical body possessing an effective filtering surface of an area comprising a large multiple of the cross sectional area of such conduit, the filtering body having a porosity whereby, the egg meats are disintegrated and made homogeneous and rendered free from chalaza, splinters or pieces of shell, and foreign matter.

4. The process of preparing eggs for canning which comprises the step of forcibly elevating egg meats from a conduit having a relatively small area in cross section and through a cylindrical body possessing an effective filtering surface of an area comprising a large multiple of the cross sectional area of such conduit, the filtering body having a porosity whereby the egg meats are disintegrated and made homogeneous and freed from chalaza, splinters or pieces of shell, and foreign matter.

5. That process of preparing eggs for canning which comprises the step of forcing egg meats from a conduit having a relatively small area in cross section and through a cylindrical body concentric of and extending beyond such conduit, such cylindrical body having an effective filtering surface of an area comprising a large multiple of the cross sectional area of such conduit and being of a porosity disintegrating the egg meats and rendering them homogeneous and freeing them from chalaza, splinters or pieces of shell, and foreign matter.

6. The process of preparing eggs for canning which comprises the step of forcibly elevating egg meats from a conduit having a relatively small area in cross section and through a cylindrical body concentric of and extending above such conduit, such cylindrical body having an effective filtering surface of an area comprising a large multiple of the cross sectional area of such conduit and being of a porosity disintegrating the egg meats and rendering them homogeneous and freeing them from chalaza, splinters or pieces of shell, and foreign matter.

WILLIAM L. LOMAX.